March 21, 1961
D. L. BABCOCK
2,975,482
METHOD OF MOLDING A PLASTIC JACKET
AROUND A PLURALITY OF INSERTS
Filed June 14, 1949
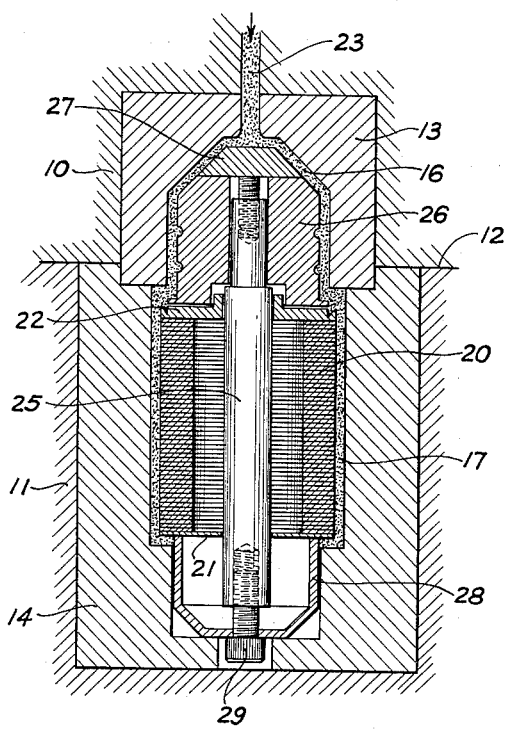
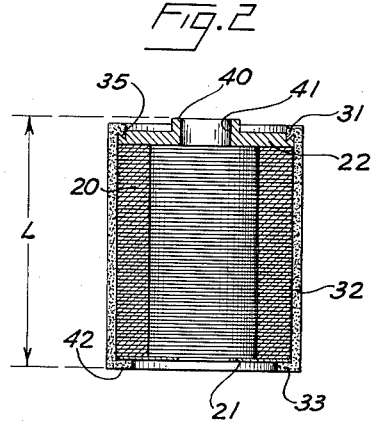
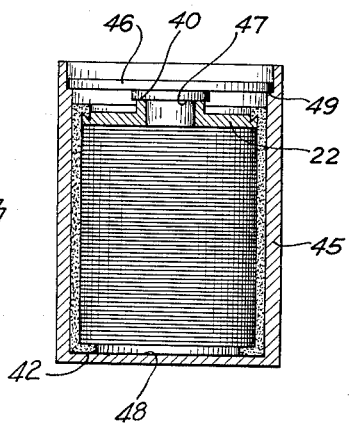
DAVID L. BABCOCK
INVENTOR
BY
ATTORNEYS

United States Patent Office 2,975,482
Patented Mar. 21, 1961

---

2,975,482

METHOD OF MOLDING A PLASTIC JACKET AROUND A PLURALITY OF INSERTS

David L. Babcock, Rochester, N.Y., assignor, by mesne assignments, to the United States of America as represented by the Secretary of the Navy Filed June 14, 1949, Ser. No. 98,923

2 Claims. (Cl. 18—47.5)

This invention relates to the manufacture of small, high voltage batteries, particularly those consisting of a stack of alternate battery plates and insulators with a molded cover or inner jacket.

Heretofore, when the jacket of plastic material was molded around the stack, a large number of molded stacks had to be rejected because of leaks which would allow electrolyte and gas to escape along the joint between the jacket of plastic and the bottom insulator of the stack.

An object of the invention is to provide a simple, reliable and effective method of forming a leak-proof seal between an insert consisting of a stack of battery plates and a jacket of plastic molded around the insert.

A second object is to do this while maintaining the distance from the top of the molded stack to the lower edge of the bottom member of the stack constant regardless of variations in the height of the stack. The effectiveness of the seal depends on this overall length being constant when the battery is placed in the container in which it is to be used.

Other objects, novel features and advantages of this invention will become apparent from the following specification and accompanying drawings wherein:

Fig. 1 is a vertical sectional view through an injection mold cavity in which an insert consisting of a stack of apertured battery plates and insulators has been centrally positioned for molding a jacket thereon according to the invention.

Fig. 2 is a vertical sectional view through the insert around which a jacket of plastic has been molded in the cavity illustrated in Fig. 1.

Fig. 3 is a vertical sectional view through a container in which the jacketed stack illustrated in Fig. 2 has been assembled.

In Fig. 1 a standard injection molding machine is represented by shaded areas 10 and 11 which contact along the parting line 12 of the mold. The dies 13 and 14 are retained in the mold sections and contain respectively jacket-shaping cavities 16 and 17 to hold an insert about which a jacket of plastic is to be molded. The plastic is fed through an orifice 23 longitudinally of the insert in accordance with the invention of Howard S. Fay described in co-filed application, Serial Number 98,922, now Patent No. 2,763,032, and the sprue formed in cavity 16 is eventually cut off from the desired plastic jacket by another invention of Howard S. Fay, also described in a co-filed application, Serial Number 98,921, but otherwise the present invention is not concerned with the molding machine or dies, but rather with the insert.

The insert consists of a cylindrical stack 20 of concentric annular and semiannular battery plates and insulators with end plates 21 and 22 and a mandrel on which the stack 20 is mounted and clamped for the molding operation. The battery plates are coated with electropositive and electronegative electrode materials as disclosed in my application, Serial Number 98,924, filed concurrently herewith, e.g., a coating of zinc and a coating of carbon are provided on opposite sides of annular steel plates. The insulators which alternate between the battery plates may conveniently be of any of the usual insulating materials, such as phenolic materials, and are formed with at least one kidney-shaped aperture in the annulus thereof corresponding to the plates. They are thus relatively fragile. Electrolyte is introduced into the volumes formed between the plates by the kidney-shaped apertures when it is desired to activate the cells of the battery. The end plates 21 and 22 are conveniently molded of a suitable insulating material, e.g., a vinyl chloride-acetate copolymer, which will effect a strong seal with the plastic jacket 32 that is subsequently molded around the insert 20. The mandrel consists of a core 25 and clamping members 26 and 28 which abut against the end plates 22 and 21 of the stack and which are held in place by screws 27 and 29 which engage in tapped holes in the ends of the core 25. When the stack is assembled on the mandrel, it is clamped firmly by tightening the screw 29. Since the stack 20 may, in actual production, vary in height by a few thousandths of an inch due to necessary manufacturing tolerances in plate and insulator thicknesses, and since variations in overall height may result in a poor fit when the jacketed insert is eventually mounted in the container in which it is to be used, which poor fit would in turn cause failure of the seal between the stack and its jacket, some provision must be made for keeping the overall control height constant. Also according to the above mentioned Fay invention the stack 20 compresses slightly under the molding pressure on screw 27 which pushes the core 25 and screw 29 downward so that screw 29 may be quite loose from member 28 at the end of the molding cycle. Correction of these height variations will be described later.

As shown in Fig. 2, the final jacketed stack has a plastic jacket 32 of a material suitable for injection molding, such as a vinyl chloride-acetate copolymer (formed in cavity 17 of Fig. 1), closely fitting plates and insulators with ends 31 and 33 engaging end plates 22 and 21 of the stack 20. The sprue formed in the cavity 16 of Fig. 1 has been cut away from the end 31 of the jacket at the time the stack is removed from the mandrel (the member 26 providing part of the cutting edge as suggested by Fay in applications mentioned above). Since the end 31 extends inward all around the rim of the plate 22, a perfect seal should result, but this did not prove to be the case in practice even though examination of a cross section shows some partial fusion at this point. It is not seen why a lock lip should be effective in producing better fusion and a better seal; nevertheless the trouble from poor sealing was entirely eliminated when an undercut 35 was made in the end plate 22 so that the end 31 of the jacket not only fits around the plate 22 but also back up into it.

After the molded stack is ejected from the cavity 17, the end 40 of an inner tube 41 forming part of the plate 22 is machined to make the length L from this end 40 to the other end 42 of the stack constant. The length of the tube 41 is thus changed to compensate for differences in the height of the stack 20 and the overall length L is constant as required. When the jacketed stack is inserted as shown in Fig. 3 in a container 45, which may be of any suitable insulating or conducting material, with one end 48 against the end surface 42 and the inner surface 47 of a cap 46 against the machined end 40, the battery is held firmly and accurately in place eliminating all troubles from breakage of the seal between the jacket and the stack of plates at any point. Fig. 3 shows the cap 46 fitting against an abutment 49 in the container 45 (and if this were replaced by a screw thread the constant length feature would lose its importance).

However, Fig. 3 is only representative of many situations wherein there is no choice about the length of the container, in which case the present constant length of insert is absolutely essential.

Thus by the combination of these two features, all seal breakage trouble has been eliminated and plastic jacketed battery stacks have proven satisfactory under the most critical conditions of use.

I claim:

1. In the method of molding a jacket of plastic material around a vertical stack of fragile apertured members, the steps of forming the bottom member of the stack with a sleeve having an outwardly extending flange at the upper edge thereof and with an undercut beginning near the outer circumference of the lower edge of the flange and extending upward at an angle, clamping the apertured members on a mandrel in aligned relation to form an insert, placing the insert centrally in a jacket-shaping cavity of an injection mold, forcing plastic under pressure into the cavity, and machining the lower edge of the sleeve a predetermined distance from the lower edge of the jacket whereby the solidified plastic in said undercut will form a leak-proof seal between the bottom member and the jacket and the height between the top of the jacket and the bottom member will be constant regardless of variation in the height of the stack.

2. In the method of molding a jacket of plastic material around a vertical stack of fragile apertured members, the steps of forming the bottom member of the stack with a sleeve having an outwardly extending flange at the upper edge thereof and with an undercut beginning near the outer circumference of the lower edge of the flange and extending upward at an angle, clamping the apertured members on a mandrel in aligned relation to form an insert, placing the insert centrally in a jacket-shaping cavity of an injection mold, forcing plastic under pressure into the cavity and into the undercut to form a strong seal between the bottom member and the jacket, and machining the sleeve a predetermined distance from the lower edge of the jacket to provide a constant height between the top of the jacket and the lower edge of the bottom member regardless of variation in the height of the stack.

References Cited in the file of this patent

UNITED STATES PATENTS

| | | |
|---|---|---|
| 1,786,945 | Hendry | Dec. 30, 1930 |
| 2,018,480 | Apple | Oct. 22, 1935 |
| 2,019,064 | Apple | Oct. 29, 1935 |
| 2,346,640 | Anthony | Apr. 18, 1944 |
| 2,450,813 | Reinhardt et al. | Oct. 5, 1948 |

FOREIGN PATENTS

| | | |
|---|---|---|
| 612,086 | Great Britain | Nov. 8, 1948 |